Patented July 13, 1937

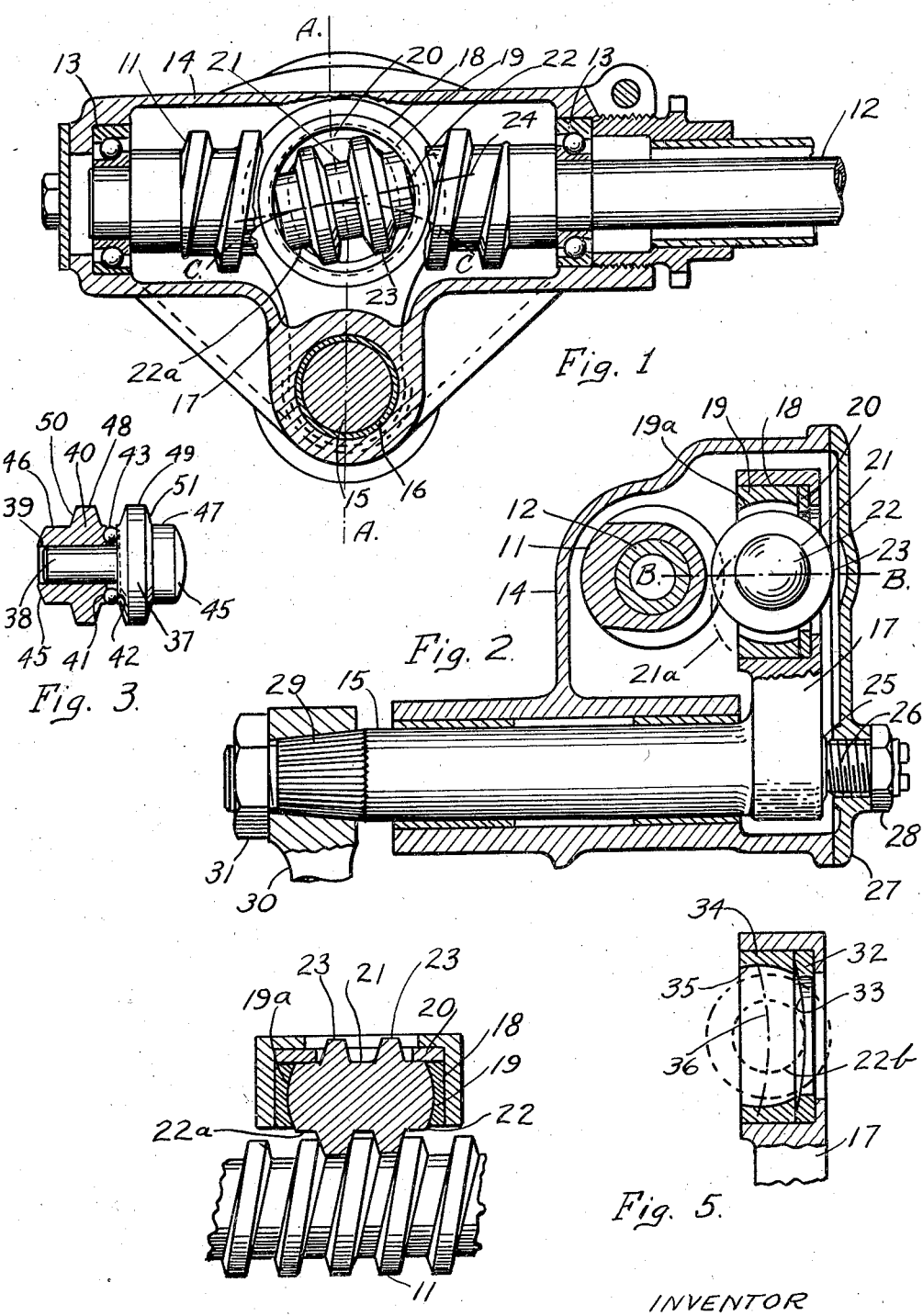

2,086,780

UNITED STATES PATENT OFFICE 2,086,780

STEERING GEAR

Azor D. Robbins, Highland Park, N. J.

Application October 1, 1934, Serial No. 746,353

10 Claims. (Cl. 74—500)

My invention relates particularly to steering gears of the type in which a helicoidal worm is engaged by a roller to impart movement to a rocker shaft when the worm is rotated.

The object of this invention is to provide a steering gear, which, while being efficient in action, will be inexpensive in construction. Another object is to provide substantial and easily renewable surfaces, where such surfaces slide or roll together.

I attain these and other objects, as hereinafter pointed out, by the mechanism illustrated in the accompanying drawing in which:—

Figure 1 is a longitudinal section through a steering gear in the vertical plane of the steering wheel shaft. Fig. 2 is a transverse section through the device on line A. A. of Fig. 1. Fig. 3 is a modified roller which may be used in the gear. Fig. 4 is a horizontal view, partly in section, on line B. B. of Fig. 2. Fig. 5 is a fragmentary section showing a modification of a part shown in Fig. 2.

Similar reference characters refer to similar parts throughout the several views.

Referring to Fig. 1 the worm 11 is keyed to the shaft 12 which is rotatably mounted in anti-friction bearings 13 and supported in the housing 14. The housing also supports a rocker shaft 15, mounted in suitable bushings 16. The shaft 15 has an arm 17 extending within the housing and said arm is adapted to traverse a plane parallel to the axis of the worm 11. The arm 17 has an opening 18 in which is securely pressed a sleeve 19 and a washer 20. The inner surface 19a of the sleeve is spherical in shape and the roller 21 has spherical ends 22 adapted to closely but movably fit the inner surface of the sleeve. The roller has a pair of tapered flanges 23 adapted to fit closely in the V shaped groove of the worm 11.

It will be seen that the roller is held in a manner which will permit it to turn on its own axis, represented by the line 24, and it can also turn in the opening on an axis parallel to the shaft 15. The roller is, however, prevented from turning on an axis vertical to the shaft 15, by means of the thrust washer 20 which supports the cylindrical parts 22a of the roller.

The shaft 15 has a projecting boss 25 adapted to be engaged by the end of an adjusting screw 26, carried in the cover 27 of the housing 14. A lock nut 28 is provided to hold the adjusting screw in any desired position. The shaft 15 has a serrated tapered end 29 projecting from the housing to carry an arm of the usual type 30, which is adapted to impart movement to the steering wheels of a vehicle. The arm 30 is secured to the shaft by a nut 31. The shaft 12 also extends from the housing and has attached thereto a steering wheel of the usual type not shown.

It will be seen that revolving the shaft 12 and worm 11 will cause the roller 21 to roll in the groove of the worm and move from one end of the worm to the other. The roller will carry the arm with it when moved in either direction, and the center of the roller will move along an arcuate path indicated by line C. C. of Fig. 1. As the flanges of the roller fit closely in the groove of the worm, the plane of the flanges will lie parallel to groove at any point of the travel of the roller, and the sleeve 19 will move around the ends of the roller when the arm is oscillated.

Referring to Fig. 1, it may be seen that the center of the roller in the mid position of travel will be approximately at the horizontal plane of the worm, and at the ends of its travel the center of the roller will be below the plane of the worm, therefore at the ends of its travel the roller will be partly withdrawn from the groove, as shown by the line 21a (Fig. 2), which indicates the outline of the roller at the end of its travel. As the flanges of the roller are tapered towards their peripheries and the groove of the worm V shaped, withdrawal of the roller from the groove will result in slackness or backlash, between the roller and the worm, at the ends of the travel of the roller.

The depth of engagement of the roller in the worm may be regulated by the adjusting screw 26 so that there is no backlash at the central point of the arm's travel. It is desirable to have a small amount of backlash at the ends of the roller's travel because it has been found that most wear, in the moving parts, takes place about the central position. Such wear may be taken up by the adjusting screw 26, without danger of tightness or binding at the ends of the roller's travel, as might be the case if no backlash was provided.

In some forms of this gear it may be desired to have a relatively wide arc of travel of the arm. In this case the roller may be withdrawn from the groove, at the ends of travel, sufficiently to cause undesirable slackness. Under these conditions means may be provided to cause the roller to move toward the vertical plane of the worm when said roller is displaced from its central position. I accomplish this by a form of thrust washer 32 (Fig. 5), in place of 20. The washer 32 has an undulating surface on its inner side 33 against which the cylindrical ends 22a of the roller bears. The washer 32 is positioned so that when the roller is in its central position, relative to the worm, the cylindrical ends of the roller will bear against the part of the undulating surface farthest from the worm as shown by line 22b which represents the outline of the cylindrical part of the roller. When the roller is moved from its central position the cylindrical ends of the roller will turn in relation to said washer and be carried to a portion of the washer which lies nearer to the vertical plane of the worm, therefore the roller is moved laterally to maintain a substantially constant depth of engagement. When using the washer 32, a sleeve 34 is used in which the inner surface is not spherical as in sleeve 19, but the center of the internal groove 35, formed in said sleeve 33, follows a line 36 parallel to the surface 33 of said washer.

Fig. 3 shows a form of roller which is divided into two parts. The roller 37 is formed with a stud 38 adapted to turn in the hole 39 formed in the roller 40. The rollers each have a groove 41 and 42, adapted to form races for the balls 43. Each roller has spherical parts 44 and 45 to engage the inner surface of the sleeve 19. The rollers also have cylindrical portions 46 and 47 to engage the washer 20.

The assembled roller, as shown in Fig. 3, has its flanges 48 and 49 spaced somewhat wider than the lead of the worm thread. Therefore the worm will bear on the outer sides 50 and 51 of the flanges. When this roller is used pressure from the worm will apply to the sides 50 and 51 depending on which direction the worm is turned, and it will be seen that when operated, the roller upon which the worm bears, will roll with said worm, while the other roller will roll with the part of the sleeve against which it bears. The use of balls, as shown in this construction, therefore reduces the friction of operation, which is desirable for heavy vehicles.

Prior to this invention it has been customary, when using a worm and roller, to use a specially formed worm which varies in shape from one end to the other and which requires special machines and a longer operation in manufacture than the uniform worm used in this invention. This worm may be made on standard worm cutting machinery.

It will be seen that the parts required for this gear are simple in character and few in number. The roller may be made with a single flange if desired and many other changes may be made without departing from the spirit of the invention as set forth in the following claims.

What I claim is:—

1. In a steering gear, a rotatably mounted helicoidal worm, a rocker shaft mounted at right angles to said worm, an arm on said shaft adapted to oscillate in a plane parallel to said worm, an opening in said arm, a roller centered in said opening by its ends and having a flange adapted to engage said worm, an annular abutment within said opening having a surface adapted to laterally support said roller and said surface adapted to laterally displace said roller when said arm is oscillated, in relation to said roller.

2. In a steering gear, a rotatably mounted helicoidal worm, a rocker shaft mounted at right angles to said worm, an arm on said shaft adapted to oscillate in a plane parallel to said worm, said arm having an opening therein, a roller axially centered in said opening by its ends engaging the sides of said opening and having a flange adapted to engage the thread of said worm, said roller having cylindrical surfaces adjacent its ends and an annular supporting surface within said opening to engage said cylindrical surfaces.

3. In a steering gear, a rotatably mounted helicoidal worm, a rocker shaft mounted at right angles to said worm, an arm on said shaft adapted to oscillate in a plane parallel to said worm, said arm having an opening therein, a roller centered in said opening by its ends and having a flange adapted to engage the thread of said worm, said roller having cylindrical surfaces adjacent its ends, an annular supporting surface within said opening to engage said cylindrical surfaces and said supporting surface adapted to laterally displace said roller when said arm is turned in relation to the axis of said roller.

4. In a steering gear, a rotatably mounted helicoidal worm, a rocker shaft mounted at right angles to said worm, an arm on said shaft adapted to oscillate in a plane parallel to said worm, said arm having an opening therein, a roller axially centered in said opening by its ends engaging the sides of said openings and having a flange adapted to engage the thread of said worm, said roller being adapted to rotate on its own axis and on an axis parallel to said rocker shaft and means carried by said arm to prevent said roller from rotating on an axis vertical to said rocker shaft.

5. In a steering gear, a rotatably mounted helicoidal worm, a rocker shaft mounted at right angles to said worm, an arm on said rocker shaft adapted to oscillate in a plane parallel to said worm, said arm having an opening therein, a roller centered in said opening by its ends and having a pair of flanges spaced wider apart than the pitch of said worm and said flanges adapted to engage said worm by their outer sides, said roller having cylindrical surfaces adjacent its ends and an annular supporting surface within said opening to engage said cylindrical surfaces.

6. In a steering gear, a rotatably mounted helicoidal worm, a rocker shaft mounted at right angles to said worm, an arm on said rocker shaft adapted to oscillate in a plane parallel to said worm, said arm having an opening therein, a roller centered in said opening by its ends and having a pair of flanges, said flanges being spaced wider apart than the pitch of the worm and said flanges adapted to engage said worm by their outer sides.

7. In a steering gear, a rotatably mounted worm, a rocker shaft mounted at right angles to said worm, an arm on said shaft adapted to oscillate in a plane parallel to said worm, said arm having a spherical opening therein, a roller having spherical ends adapted to engage the sides of said opening, a flange on the roller adapted to engage the thread of said worm, said roller having cylindrical surfaces adjacent its ends and an annular supporting surface within said opening to engage said cylindrical surfaces.

8. In a steering gear, a rotatably mounted worm, a rocker shaft mounted at right angles to said worm, an arm on said shaft adapted to oscillate beside the worm, said arm having a spherical opening therein, a roller having spherical ends adapted to engage the sides of said opening, a pair of flanges on said roller adapted to engage the thread of said worm with the outer sides of said flanges, said roller being adapted to rotate on its own axis and on an axis parallel to said rocker shaft and means carried by said arm to prevent said roller from rotating on an axis vertical to said rocker shaft.

9. In a steering gear, a rotatably mounted worm, a rocker shaft mounted at right angles to said worm, an arm on said rocker shaft adapted to oscillate in a plane beside said worm, said arm having a spherical opening therein, a roller mounted in said opening and comprising a pair of flanges independently rotatably on a common axis, a series of balls between said flanges, a boss on each of said flanges adapted to engage the walls of said opening and form a rolling support for the other of said flanges and said flanges adapted to engage said worm.

10. In a steering gear, a rotatably mounted worm, a rocker shaft mounted at right angles to said worm, an arm on said rocker shaft having a spherical opening therein, a driving member comprising a flanged roller having a spindle and a second flange journaled on said spindle, a cylindrical boss on each of said flanges, a supporting flange within said opening adapted to engage said cylindrical bosses, spherical surfaces on said flanges adapted to engage the walls of said opening, said driving member being adapted to engage the thread of said worm and to turn on an axis parallel to the axis of said rocker shaft.

AZOR D. ROBBINS.